July 15, 1952  C. E. BARKALOW  2,603,095

GYRO ERECTING MECHANISM

Filed May 16, 1946  3 Sheets-Sheet 1

INVENTOR
CLARE E. BARKALOW
BY
ATTORNEY

July 15, 1952　　　　　　C. E. BARKALOW　　　　　2,603,095
GYRO ERECTING MECHANISM

Filed May 16, 1946　　　　　　　　　　　　　　　3 Sheets-Sheet 2

INVENTOR
CLARE E. BARKALOW
BY
ATTORNEY

July 15, 1952  C. E. BARKALOW  2,603,095
GYRO ERECTING MECHANISM
Filed May 16, 1946  3 Sheets-Sheet 3
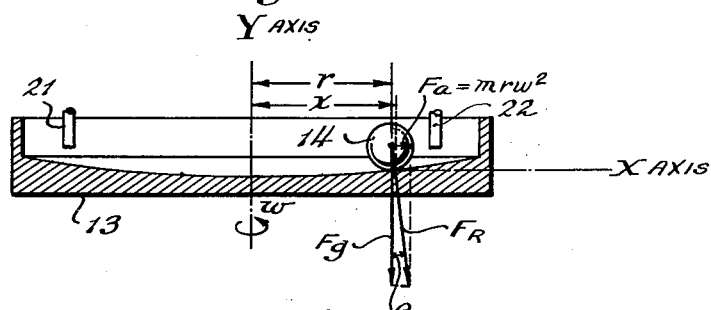
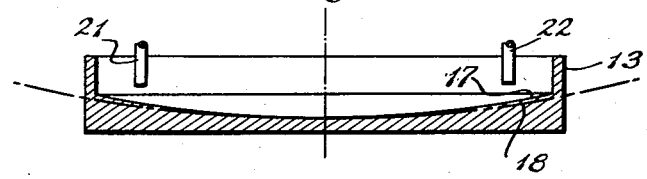
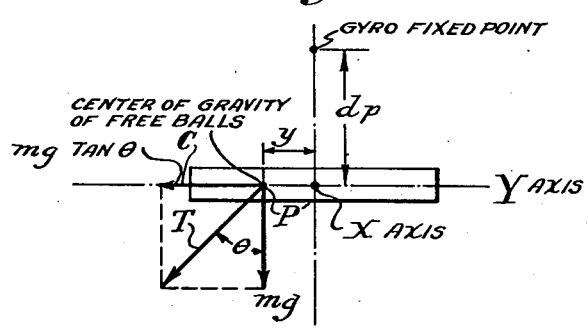
INVENTOR
CLARE E. BARKALOW
BY
Herbert H. Thompson
his ATTORNEY.

Patented July 15, 1952

2,603,095

UNITED STATES PATENT OFFICE 2,603,095

GYRO ERECTING MECHANISM

Clare E. Barkalow, Floral Park, N. Y., assignor to The Sperry Corporation, a corporation of Delaware Application May 16, 1946, Serial No. 670,263

6 Claims. (Cl. 74—5.44)

This invention relates to gyro erection systems and in particular, relates to an improvement in an erecting device for gyro verticals having a continuously rotating part containing a freely rolling mass or plurality of freely rolling masses.

In a manner known to the art, such a container is slowly rotated in the direction of the gyro rotor but at a much slower speed, said container being mounted on the gyro rotor bearing frame and an erecting torque is produced thereon in quadrature with the gyro tilt. It has been proposed to use a flat or slight conically surfaced container with detaining pins at its periphery and containing several free balls. The containers, or discs, are mounted on the gyro rotor frame and rotated by the gyro rotor, at a constant and reduced speed. As the gyro rotor bearing frame tilts the container, the free balls would roll to the low side of the rotating container and be transported by the peripheral detaining pins nearly 180°. Thereupon, gravity acts to free the balls from the pins and they would once more roll to the low side of the container. The result of this movement of the free balls is to produce an effective force at the mean center of gravity of all of the balls, which approaches a quadrature relationship to the low side of the disc. In this manner a torque in quadrature with the tilt of the gyro rotor bearing frame is produced, and this torque applied through the disc causes the gyro rotor bearing frame to erect in a direct path. However, severe limitations to this system were discovered in practice in that the conical-shaped ball supporting surface of the container acted to restrain the balls from free movement on the container to the extent that a gyro rotor bearing frame tilt in excess of the angle of the cone was required before the balls could move from the center and thereby effect precession. On the other hand, if a flat bottom rotary container were employed, centrifugal force acting on the balls due to rotation of the container would cause them to roll to the periphery and be retained there for a given angle of tilt of the dish, thereby preventing normal ball action and eliminating erection within the range of this specific angle from the vertical.

In accordance with my invention, a disc or saucer-like container, containing a free mass, or masses such as free balls, is provided, and the surface of the disc or container is shaped to continually present a surface normal or substantially normal to the resultant of the acceleration forces active on said free balls, including that of gravity. Another factor effecting the proper erection is the effect of turns of the aircraft on the erector, i. e., the effect of centrifugal force due to turning of the aircraft on the gyro vertical. Any gravitational factor is, of course, effected by centrifugal forces. A gyroscope which is erected by being made pendulous will generally be found to be tilted laterally after a turn, while one that is erected by an erection device, such as shown herein, will usually be found to be tilted forwardly after a turn. While most modern gyro verticals depend primarily upon some sort of erection device, it has been found advantageous also to make the gyro slightly pendulous, so that it will stand vertical when not running and for other reasons. This design results in the gyro being both inclined forwardly and laterally after a turn. The former defect is shown as overcome in the present invention by inclining the gyro slightly forwardly as shown in Fig. 2, as heretofore proposed in the prior art, see Braddon Patent 2,409,659 for Gyro-Verticals, dated October 22, 1946. While the latter defect may be overcome by lateral inclinations as proposed in the patent to Braddon, No. 2,425,300, dated August 12, 1947, for Gyroscopic Horizons, I have discovered that this defect may be corrected more simply and just as effectively by so correlating the mass of the balls to the pendulosity of the system that the couple acting on the gyro through the balls due to centrifugal force balances the couple acting on the gyro due to the pendulous factor during turns for a predetermined centrifugal force, that is, for a predetermined bank angle which is a measure of centrifugal force, as well understood in the art.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

Other objects and advantages will become apparent from the specification, taken in connection with the accompanying drawings wherein:

Fig. 3 is a sectional view of a form of container.

Fig. 4 is a sectional view of an alternative form of a container.

Fig. 7 indicates the forces active at the average center of gravity of the ball system during a banked turn.

Figure 1:
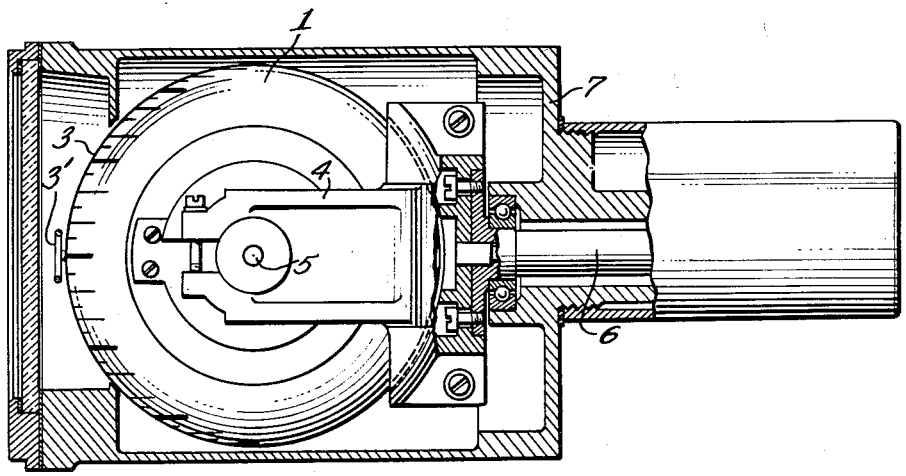
Fig. 1 illustrates an aircraft instrument establishing a vertical reference.

Referring now to Fig. 1, of the drawing, a typical aircraft attitude instrument of the type using a gyro vertical to establish a vertical reference is illustrated. The main parts visible in this figure are the generally spherical shell 1, which is secured to and substantially encloses the rotor bearing frame 12 (Fig. 2) and which is provided with attitude markings 3 readable against index 3'; the U-shaped gimbal ring 4 which pivotally supports the rotor bearing frame on a normally transverse axis 5 and is in turn pivotally supported on a fore-and-aft axis by shaft 6 journaled in the housing 7.

Figure 2:
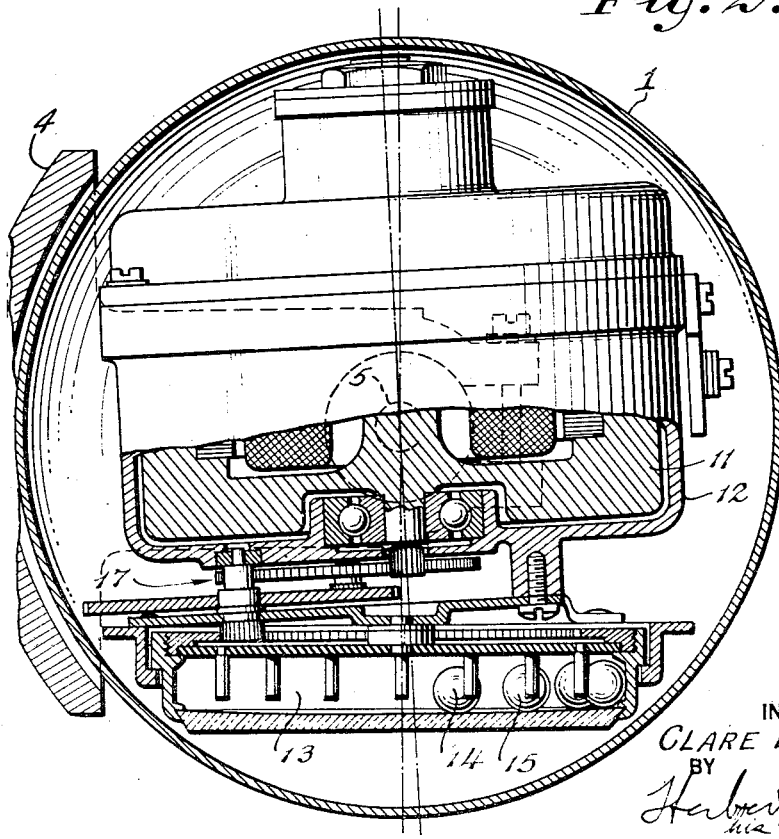
Fig. 2 is a sectional view of gyro vertical having a rotor bearing frame with a rotatable ball carrying container.

In Fig. 2 the gyro rotor 11 of the gyro vertical is shown as mounted for spinning about a nearly vertical axis within rotor bearing frame 12.

Tiltable with the spin axis of the gyro vertical 11 is a rotatable container 13, on which a free mass, or as in this embodiment, a plurality of free ball bearings, 14, 15, etc. is placed. The gyro spin axis and the rotational axis of the container are not coaxial, but rather, are set at a slight angle, the gyro spin axis being several degrees removed from the vertical in a manner well known in the art, to reduce turn errors produced by centrifugal force acting on the erector mechanism, to a minimum. Thus, the rotational axis of the container is maintained in a truly vertical position, thereby establishing a vertical reference, but the gyro spin axis, although it may be truly vertical, is preferably tilted forwardly several degrees to correct for turning errors as pointed out in the aforesaid patent to F. D. Braddon, No. 2,409,659, and further considered in the application of Braddon and Wrigley, Serial No. 566,568 filed December 4, 1944. The arrangement of the gear box 17 serves to effect this relation and to drive the container from the gyro rotor, at a constant but greatly reduced speed.

The container 13 is shown in cross section in Fig. 3. To illustrate the method of determining a surface for the container 13, that will be normal to the resultant of acceleration produced forces on the plurality of free balls placed thereon and rotating in cooperation therewith, consider the forces acting on the single free ball 14. The force of centrifugal acceleration, $F_a$ is equal to the mass times the distance of the weight from the center of rotation times the square of the rotational speed, or $$F_a = mrw^2 \quad (1)$$

where $m$=mass of the ball, $r$=distance to axis of rotation and $w$=angular velocity. The force of gravity $F_g$, pulling the ball downward is $$F_g = mg \quad (2)$$

where $g$=acceleration due to gravity. The resultant force $F_R$, being active at an angle $\theta$, yields, $$\tan \theta = \frac{F_a}{F_g} = \frac{rw^2}{g} \quad (3)$$

or as $r \cong x$ where $x$ is the distance from the $y$ axis of the point of contact of the ball 14 with its supporting surface, $$\tan \theta = \frac{xw^2}{g} \quad (4)$$

However, $$\tan \theta = \frac{dy}{dx} \quad (5)$$

substituting $$\frac{dy}{dx} = \frac{w^2 x}{g} \quad (6)$$

and integrating we have $$y = \frac{w^2}{2g} x^2 \quad (7)$$

The Equation 7 will be recognized as describing a parabola. Hence, for a given rotational speed, it becomes possible to determine the exact shape or contour for the surface of the container 13, wherein the balls travelling thereon will always find a surface normal to the resultant of the acceleration produced forces.

Figure 5:
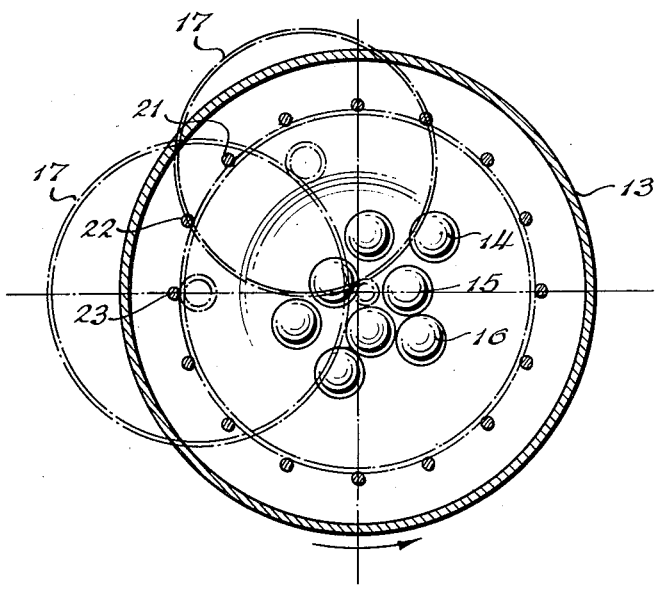
Fig. 5 is a top view of container with the free balls as they would appear in a balanced condition.

Fig. 5 shows a top view of the container 13, when the rotational axis of the container is in a true vertical position. The balls 14, 15, 16, etc. are randomly located about the axis of rotation of the container, as the tendency for centrifugal acceleration to send them to the peripherally located pins 21, 22, 23 is counteracted by the contour of the ball supporting surface of the container for any position of the ball. Further, it has been found that while a paraboloidal ball supporting surface is the ideal surface for counteracting the effects of centrifugal acceleration forces acting on the free balls, effectively the same result may be achieved with a spherical ball supporting surface, or any other concave surface that would substantially approximate the contour of a parabola. Thus Fig. 4 shows an acceptable spherical surface 17 as compared to the ideal paraboloidal surface 18.

Experiment has shown that the proper spacing of the compartments or pins 21, 22, 23, etc. is determinable, to obtain an optimum rate or erection, in a system providing a given number of free balls of a given density, and where the rotational speed of the container 13 is constant. Similarly determinable is the optimum quantity of free balls and the optimum density of the free balls. Thus, in an embodiment wherein the size of the free balls is dictated by structural requirements of the gyro rotor and rotor bearing frame, the density of the ball material may be determined to produce an optimum erection rate. Furthermore, the spacing of the peripheral compartments, or in this embodiment, sometimes called detaining pins, will also affect the erection characteristics as the location of the resultant center of gravity of the shifting balls will be dependent on how effectively they are retained at the periphery of these compartments or detaining pins. The spacing of these compartments will also affect the pendulosity of the system, thereby affecting the erection characteristics.

Figure 6:
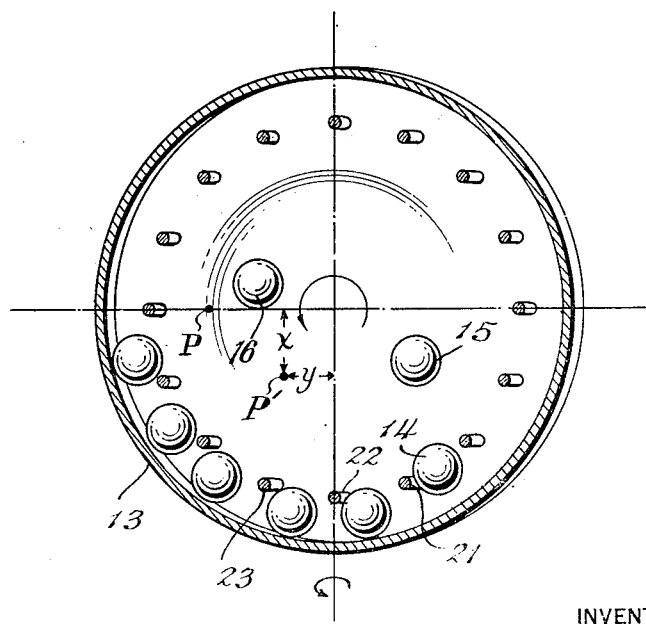
Fig. 6 is a top view of a tilted container showing the distribution of the balls.

Figs. 5 and 6 serve to indicate the manner in which the free balls roll to the low point of a tilted container and are thereupon detained at the periphery by the detaining pins 21, 22, 23, etc., and are carried at the periphery for nearly 180°, or until such time as the gravitational force on the balls serves to roll it free of the detaining pin, and thence once again roll to the low point of the container. Fig. 5 shows the position of the balls with the container level and Fig. 6 shows their position with the container tilted, so that the left-hand side is depressed below the level of the paper. With the disc rotating counterclockwise as shown by the arrow, the majority of the balls are shown as in the act of being carried from the low side toward the high side and two of the balls 15 and 16 are shown as having rolled out of their pockets behind the pins 21 and rolling toward the low side of the bottom plate. Thus, the effective center of gravity of the balls is removed from the low point of the container, represented at point P in Fig. 6, to a point P', and hence serves as a torque producing means, said torque having one component $x$ acting in quadrature relation to the tilt (the true erection torque), and another component $y$, about the axis of tilt, and constituting the pendulosity torque.

In the embodiment of the invention herein disclosed, it was found desirable to construct the unit to be balanced when comprising the gyro rotor, the rotor frame, and the container and its reduced speed drive. In this construction, the only unbalancing effect was that which was produced when the free balls were placed on the container. In order to consider the effect of this pendulosity during a turn, a condition that arises frequently if the system were installed in an aircraft, the effect of the free balls may be considered to be the same as though the sum of their masses were located at their effective center of gravity P' (Figs. 6 and 7). Although Fig. 6 is drawn primarily to indicate the behavior of the balls upon a downward tilt of the left-hand side of the figure, it likewise illustrates the behavior of the balls under a lateral acceleration force to the left, which condition is also shown in Fig. 7, which represents a front elevation of Fig. 6. Under these conditions there are two acceleration forces acting at the point P', namely, gravity $mg$ acting downwardly and centrifugal force C acting laterally, the total force being shown at T acting at an angle $\theta$ to the vertical. The angle $\theta$ is, of course, the angle which a free pendulum would assume during a turn which is also the correct angle of bank for the aircraft under the conditions represented.

From Fig. 7, it is readily apparent that the centrifugal force C is always equal to $mg \tan \theta$. Considering the couples acting on the gyroscope under these conditions, the gravitational couple $T_g$ will be counterclockwise and equal to $mgy$ or $$T_g = mgy$$

while the centrifugal couple $T_p$ will be $d_p\, mg \tan \theta$, where $d_p$ is the distance of the ball below the pivotal point of support of the gyro, or $$T_p = d_p\, mg \tan \theta$$

Inasmuch as these torques or couples are in opposition to each other, it is desired that they counteract each other thereby avoiding any turn error due to pendulosity. Equating these equations for $T_p$ and $T_g$ yields;

$$mgy = d_p\, mg \tan \theta$$

or $$\tan \theta = \frac{y}{d_p}$$

Thus, for a predetermined bank angle $\theta$ (representing a predetermined centrifugal force due to the product of rate of turn and air speed), the gyro may be designed that the acceleration force resulting from that turn affecting the pendulous factor of the gyro vertical is balanced by a component or centrifugal torque, the anti-pendulous torque of the erecting system. In the design, it is usual to so correlate the mass of balls with the gyro constants that $T_p$ and $T_g$ are exactly balanced for a procedure turn at the normal cruising speed. With such a design, the turn errors due to this cause are also reduced for other rates of turn and air speeds in proportion to the departure of the bank angle from that proper for the selected centrifugal force.

My invention therefore, supplies a means for overcoming the error of a gyro vertical having a pendulous factor during turns without the necessity for inclining the gyro laterally.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An erecting mechanism for gyro verticals with a universally supported rotor frame including a container rotatably mounted on the frame to move about a normally vertical axis having a substantially paraboloidal concave ball-carrying surface whose axis is concentric with the axis of the container, a free ball carried on said surface affected by centrifugal acceleration due to the rotation of the container and by gravitational acceleration, a plurality of peripherally spaced compartments on said container for receiving and transporting said ball whenever the frame tilts from a normal position, means for rotating the container at a constant speed, the speed of rotation of the container and the curvature of the substantially paraboloidal surface being such that, with the container moving about a vertical axis, the resultant of the gravitational and centrifugal accelerations acting on the ball, with the ball in any position on the surface, is along a line substantially normal to the surface, the arrangement permitting the ball to roll to the low side of the container upon the slightest amount of tilt of the frame from a normal position.

2. An erecting mechanism for gyro verticals with a universally supported rotor frame including a container rotatably mounted on the frame to move about a normally vertical axis having a spherical concave ball-carrying surface whose axis is concentric with the axis of the container, a free ball carried on said surface affected by centrifugal acceleration due to the rotation of the container and by gravitational acceleration, a plurality of peripherally spaced compartments on said container for receiving and transporting said ball whenever the frame tilts from a normal position, means for rotating the container at a constant speed, the speed of rotation of the container and the curvature of the spherical surface being such that, with the container moving about a vertical axis, the resultant of the gravitational and centrifugal accelerations acting on the ball, with the ball in any position on the surface, is along a line substantially normal to the surface, the arrangement permitting the ball to roll to the low side of the container upon the slightest amount of tilt of the frame from a normal position.

3. An erecting mechanism for gyro verticals with a universally supported rotor frame including a container rotatably mounted on the frame to move about a normally vertical axis having a substantially paraboloidal concave ball-carrying surface whose axis is concentric with the axis of the container, a plurality of free balls carried on said surface affected by centrifugal acceleration due to the rotation of the container and by gravitational acceleration, a plurality of peripherally spaced detaining pins on said container for receiving and transporting said balls whenever the frame tilts from a normal position, means for rotating the container at a constant speed, the speed of rotation of the container and the curvature of the substantially paraboloidal surface being such that, with the container moving about a vertical axis, the resultant of the gravitational and centrifugal accelerations acting on the individual balls, with the balls in any position on the surface, is along a line substantially normal to the surface, the arrangement permitting the balls to roll to the low side of the container upon the slightest amount of tilt of the frame from a normal position.

4. An erecting mechanism for gyro verticals with a universally supported rotor frame including a container rotatably mounted on the frame to move about a normally vertical axis having a spherical concave ball-carrying surface whose axis is concentric with the axis of the container, a plurality of free balls carried on said surface affected by centrifugal acceleration due to the rotation of the container and by gravitational acceleration, a plurality of peripherally spaced detaining pins on said container for receiving and transporting said balls whenever the frame tilts from a normal position, means for rotating the container at a constant speed, the speed of rotation of the container and the curvature of the spherical surface being such that, with the container moving about a vertical axis, the resultant of the gravitational and centrifugal accelerations acting on the individual balls, with the balls in any position on the surface, is along a line substantially normal to the surface, the arrangement permitting the balls to roll to the low side of the container upon the slightest amount of tilt of the frame from a normal position.

5. In an aircraft gyro vertical, a rotor bearing frame, an erecting mechanism of the rolling ball type including a container rotatably mounted on said frame for movement about a normally vertical axis having a slightly concave ball-carrying surface whose axis is concentric with the axis of the container, means for rotating said container at a constant speed, and a ball free to roll on said surface providing sufficient pendulosity to the gyro vertical to maintain it in a substantially vertical reference position when the gyro rotor is not rotating; said ball, the speed of rotation of said container and the curvature of the ball-carrying surface being such as to provide a gravitational torque acting on the gyro vertical through said erecting mechanism that substantially balances the distributing torque exerted on the gyro vertical by centrifugal acceleration when the craft is turning at a predetermined rate.

6. In an aircraft gyro vertical, a rotor bearing frame, an erecting mechanism of the rolling ball type include a container rotatably mounted on said frame for movement about a normally vertical axis having a spherical concave ball-carrying surface whose axis is concentric with the axis of the container, means for rotating said container at a constant speed, and a plurality of balls free to roll on said surface providing sufficient pendulosity to the gyro vertical to maintain it in a substantially vertical reference position when the gyro rotor is not rotating; said balls, the speed of rotation of said container and the curvature of the ball-carrying surface being such as to provide a gravitational torque acting on the gyro vertical through said erecting mechanism that substantially balances the disturbing torque exerted on the gyro vertical by centrifugal acceleration when the craft is in a procedure turn.

CLARE E. BARKALOW.

REFERENCES CITED

The following references are of record in the file of this patent:

UNITED STATES PATENTS

| Number | Name | Date |
| --- | --- | --- |
| 2,380,538 | Meredith | July 31, 1945 |
| 2,439,418 | Davenport | Apr. 13, 1948 |
| 2,457,150 | Herondelle | Dec. 28, 1948 |

FOREIGN PATENTS

| Number | Country | Date |
| --- | --- | --- |
| 785,614 | France | Aug. 14, 1935 |